United States Patent Office 3,111,302
Patented Nov. 19, 1963

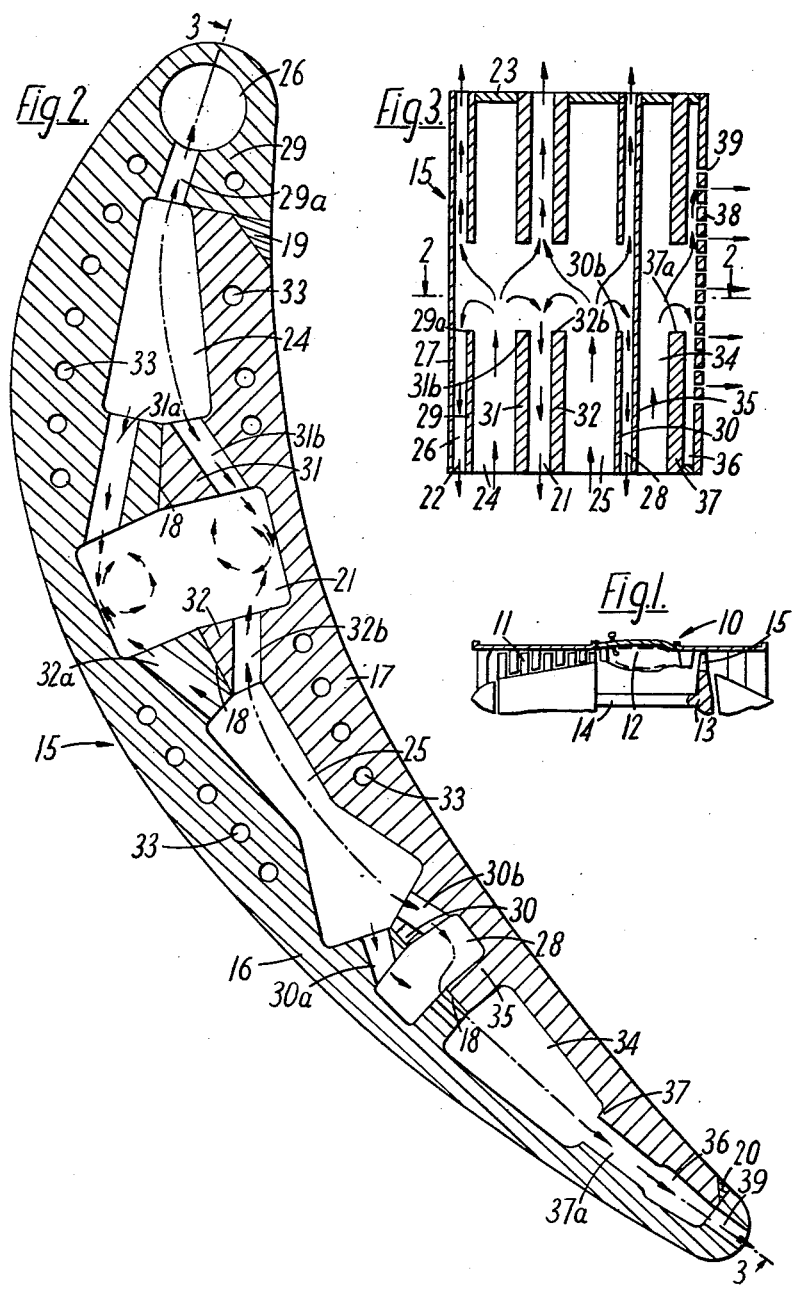

3,111,302
BLADES FOR FLUID FLOW MACHINES
Thomas Bowmer, Wollaton, England, assignor to Rolls-Royce Limited, Derby, Derbyshire, England, a company of Great Britain
Filed Dec. 19, 1960, Ser. No. 76,772
Claims priority, application Great Britain Jan. 5, 1960
7 Claims. (Cl. 253—39.15)

This invention concerns blades for fluid flow machines, e.g. turbine rotor blades for gas turbine engines.

The term "blade" is used in this specification in a broad sense to include blade-like members adapted for use in turbines, compressors and the like.

According to the present invention there is provided a blade adapted for use in a fluid flow machine and having formed therein a fluid conduit for the flow therethrough of a cooling fluid, and means for supplying said conduit with at least two streams of cooling fluid which impinge on each other within said conduit so as to cause turbulence therein.

Such turbulence will cause breaking up of the boundary layer of the cooling fluid (e.g. cooling air) which flows in contact with the walls of the said conduit, whereby the heat transfer coefficient between the blade and the cooling fluid will be improved. The turbulence will also cause an increased "scrubbing" action of the cooling fluid on the walls of the said conduit and this will also assist in promoting cooling of the blade.

Preferably, two fluid supply passageways are formed in the blade, there being provided means for directing into said conduit at least part of the fluid flow through each supply passageway in the form of a stream which impinges on the stream from the other passageway.

Means are preferably provided for cooling the cooling fluid passing through each supply passageway. Such means may comprise a plurality of drillings through said blade which are disposed adjacent each supply passageway and which are adapted to be supplied with cooling fluid.

The said conduit is preferably disposed between the two supply passageways and has a common wall with each supply passageway, each said wall having at least one aperture therein through which a said stream of cooling fluid may flow.

Each supply passageway preferably supplies a part of its cooling fluid to said conduit and another part to a cooling fluid duct extending through said blade from the root to the tip thereof.

The said streams preferably impinge on each other adjacent the mid-height of the blade. This ensures that the mid-height portion of the blade, which becomes the hottest part thereof, is subjected to the most cooling.

Means may be provided for cooling the trailing edge of the blade. Such means may comprise a fluid supply passage, adapted to be supplied with cooling fluid through the root of the blade, and a channel which has a common apertured wall with the fluid supply passage, said channel supplying cooling fluid to apertures in the trailing edge.

The blade is preferably formed in two parts which are connected to each other at the chord line of the blade.

The invention also includes within its scope a turbine (e.g. a turbine of a gas turbine engine) provided with a blade as set forth above.

The invention is illustrated, merely by way of example, in the accompanying drawings in which:

FIGURE 1 is a diagrammatic section through a gas turbine engine, and

FIGURES 2 and 3 are sections (to different scales) through a turbine blade of the engine of FIGURE 1, the sections being taken on the line 2—2 of FIGURE 3 and 3—3 of FIGURE 2 respectively.

Referring to the drawings a gas turbine engine 10 comprises in flow series a compressor 11, combustion equipment 12, and a turbine 13, the turbine 13 driving the compressor 11 through a shaft 14.

The turbine 13 has rotor blades 15 which are best seen in FIGURES 2 and 3. Each blade 15 is formed in two parts 16, 17 which abut at the mid chord line 18 of the blade and which are brazed together, as at 19, 20.

Each blade 15 has formed therein a conduit 21 which is open both at the root 22 and at the tip 23 of the blade.

On opposite sides of the conduit 21 are cooling air supply passageways 24, 25 respectively. Each of the supply passageways 24, 25 is open at the root 22 of the blade to a supply of cooling air (e.g. from the compressor 11) but is closed at the tip 23 of the blade.

On the side of the supply passageway 24 opposite to the conduit 21 is a duct 26 which is disposed adjacent the leading edge 27 of the blade. On the side of the supply passageway 25 opposite to the conduit 21 is a duct 28. The ducts 26, 28 extend between and are open at both the root and the tip of the blade.

The ducts 26, 28 are separated from the supply passageways 24, 25 respectively by walls 29, 30 respectively, while the conduit 21 is separated from the supply passageways 24, 25 respectively by walls 31, 32 respectively. The wall 29 has a single elongated slot 29a extending therethrough, the slot 29a extending along the mid chord line 18 of the blade. Each of the walls 30, 31, 32, however, is respectively provided with a pair of elongated slots 30a, 30b, 31a, 31b, and 32a, 32b, each of which slots is disposed at an angle to the mid chord line 18. All the slots 29a, 30a, 30b, 31a, 31b, 32a, 32b are disposed at the mid-height of the blade, i.e. halfway between the root and the tip of the blade.

The slots 29a, 30a, 30b, 31a, 31b, 32a, 32b form, in effect, nozzles for the flow therethrough of cooling air. Thus part of the cooling air supplied to the supply passageway 24 will pass via the slot 29a to the duct 26 while the remainder of the cooling air will pass via the slots 31a, 31b to the conduit 21. Similarly, part of the cooling air supplied to the supply passageway 25 will pass via the slots 30a, 30b to the duct 28 while the remainder of this cooling air will pass via the slots 32a, 32b to the conduit 21.

It will be noted that the streams of cooling air passing through the slots 31a, 31b will hit the walls of the conduit 21 and will impinge on the streams of cooling air which have passed through the slots 32a, 32b. This will produce turbulence in the conduit 21 which, as pointed out above, will increase the cooling effect of the cooling air passing through the conduit 21. The impingement will also increase the mean angle of incidence (as shown) with which said streams impinge against the conduit outer walls. The turbulence, and hence the cooling effect, is moreover greatest at the mid-height of the blade which is, in operation the hottest part thereof.

In order to ensure that the cooling air supplied to the conduit 21 via the slots 31a, 31b, 32a, 32b is as cool as possible, the blade is provided on opposite sides of each of the supply passageways 24, 25 with a series of drillings 33. Each of the drillings 33 extends between and is open at the root and tip of the blade and is supplied with cooling air.

Each of the blades 15 is also provided with a cooling air supply passage 34 which has a common unapertured wall 35 with the duct 28. The passage 34 is open at the root of the blade to a supply of cooling air but is closed at the tip of the blade. A channel 36, which has closed ends at the root and tip of the blade, has a common wall 37 with the passage 34. The channel 36, which is adapted to be supplied with cooling air by way of an elongated slot 37a in the wall 37, is disposed adjacent the trailing edge 38 of the blade. Air from the channel 36 effects cooling of the trailing edge 38 by passing through apertures 39 therein.

Small vents (not shown) may be provided communicating with the closed-off tip portions of the passageways 24, 25, 34 and channel 36 so as to prevent stagnation of the air in the said closed-off portions.

The construction described above with reference to the drawings is particularly well suited for large engines having large turbine blades with adequate room for the various cooling air flow paths therethrough.

I claim:

1. An aerofoil blade adapted for use in turbines, compressors and the like, said blade being formed of heat conductive material and having external aerofoil surfaces and having walls defining an internal fluid conduit, and walls defining at least two internal cooling fluid supply passageways, some of said walls being common to conduit and passageways, said common walls being thick and disposed at right angles to the aerofoil surface of the blade, slots formed through said common walls adjacent the mid-length only thereof, said slots being oblique to said common walls in such a way that when a cooling fluid is supplied to the supply passageways it emerges from said slots into said fluid conduit in two streams which are each directed obliquely towards a portion of said conduit walls remote from said slots, whereby substantially the whole of said two streams impinges against said conduit walls and said two streams also impinge against each other and create turbulence within the fluid conduit, said conduit also opening externally of the blade at both ends thereof and forming escape passages for the cooling fluid from the blade.

2. An aerofoil blade as claimed in claim 1 in which said two streams impinge against each other adjacent said conduit walls in such a manner as to increase the mean angle of incidence with which they impinge against said conduit walls.

3. A blade having external aerofoil surfaces and adapted for use in turbines, compressors and the like, said blade being formed of heat conducting material and having walls defining a fluid conduit extending longitudinally within the blade, and walls defining two internal cooling fluid supply passageways extending on opposite sides of said fluid conduit, some said walls being common to conduit and passageways, said common walls being thick and disposed at right angles to the aerofoil surfaces of the blade, said cooling fluid supply passageways communicating with said fluid conduit through slots extending chordwise of the blade through said common walls, said slots being located adjacent the mid-height only of the common walls, each slot terminating in a respective port, said slots being oblique to said common walls in such a way that when a cooling fluid is supplied to said passageways it emerges into said fluid conduit from said ports in two streams which are each directed towards a portion of said conduit walls remote from said ports and adjacent one of said external aerofoil surfaces of the blade, whereby substantially the whole of said two streams impinges against said portion, and that said two streams impinge against each other adjacent said portion so as to increase the mean angle of incidence with which they impinge against said portion, and so as to create turbulence within the fluid conduit, said fluid conduit opening externally of the blade at both ends thereof so that the cooling fluid escapes from the blade through said fluid conduit only remote from said mid-height.

4. A blade as claimed in claim 3 which is formed of only two substantially solid parts having surfaces which register with one another within the blade, said surfaces being so formed as to define therebetween said fluid conduit and said two cooling fluid supply passageways which extend on opposite sides of said fluid conduit, said surfaces abutting one another substantially along the chord line of the blade at least between each cooling fluid supply passageway and said fluid conduit.

5. A blade as claimed in claim 3 including a plurality of drillings extending longitudinally through the material of said blade adjacent said two cooling fluid supply passageways and between them and the airfoil surfaces and adapted to be supplied with cooling fluid for cooling said external aerofoil surface of the blade in the vicinity of said two cooling fluid supply passageways, whereby to preserve the low temperature of the cooling fluid being delivered to the mid section of the said fluid conduit.

6. A blade having external aerofoil surfaces with leading and trailing longitudinal edges, and adapted for use in turbines, compressors and the like, said blade being substantially solid formed of heat conducting material and having walls defining a fluid conduit extending longitudinally within the blade, and walls further defining two internal cooling fluid supply passageways extending on opposite sides of said fluid conduit, some of said walls being common to conduit and passageways, said common walls being thick and disposed at right angles to said aerofoil surfaces, and a discharge duct extending adjacent one of said cooling fluid supply passageways and one of said longitudinal edges, said one cooling fluid supply passageway communicating with said discharge duct through an aperture extending chordwise of the blades adjacent the mid-height only thereof, and said cooling fluid supply passageways communicating with said fluid conduit through slots extending chordwise of the blade through said common walls, said slots being adjacent the mid-height only of the blade, each slot terminating in a respective port, said slots being oblique to said common walls in such a way that when a cooling fluid is supplied to said cooling supply passageways, it emerges into said fluid conduit from said ports in two streams which are each directed towards a portion of said conduit walls remote from said ports, said portion being adjacent one of said external aerofoil surfaces of the blade, whereby substantially the whole of said two streams impinges against said portion, and that said two streams also impinge against each other adjacent said portion so as to increase the mean angle of incidence with which said two streams impinge against said portion, and so as to create turbulence within the fluid conduit, said fluid conduit and said discharge duct opening externally of the blade at both ends thereof so that the cooling fluid may escape radially from the blade via said fluid conduit and said discharge duct.

7. A blade having external aerofoil surfaces with leading and trailing longitudinal edges, and adapted for use in turbines, compressors and the like, said blade being formed of heat conducting material and having walls defining a fluid conduit extending longitudinally within the blade, and walls further defining two internal cooling fluid supply passageways extending on opposite sides of said fluid conduit, some of said walls being common to conduit and passageways, said common walls being thick and disposed at right angles to said aerofoil surfaces, each of said cooling fluid supply passageways communicating with said fluid conduit through at least one slot, said slots extending chordwise of the blade through said common walls, and only adjacent the mid-height thereof, each slot terminating in a respective port, said slots being oblique to said common walls in such a way that when a cooling fluid is supplied to said passageways it emerges into said fluid conduit from said ports in two streams which are each directed towards a portion of said conduit walls remote from said ports, said portion being adjacent one of said external aerofoil surfaces of the blade, whereby substantially the whole of said two streams impinges against said portion, and that said two streams impinge against each other adjacent said portion so as to increase the mean angle of incidence with which said two streams impinge against said portion so as to create turbulence within the fluid conduit, means whereby the cooling fluid may escape from the blade after said turbulence, the blade internal walls further defining a cooling fluid duct means through which in operation a cooling fluid flows for cooling the trailing longitudinal edge of the blade, said cooling fluid duct means comprising a fluid supply passage adapted to be directly supplied with cooling fluid, a channel extending adjacent the trailing longitudinal edge of the blade, said channel communicating with said last mentioned cooling fluid supply passage through a chordwise extending aperture adjacent the mid-height of the blade, and said channel communicating with the exterior of the blade through a plurality of apertures spaced longitudinally in said trailing longitudinal edge of the blade.

References Cited in the file of this patent

UNITED STATES PATENTS

| | | |
|---|---|---|
| 2,647,368 | Triebbnigg | Aug. 4, 1953 |
| 2,787,049 | Stalker | Apr. 2, 1957 |
| 2,823,894 | Gerdan et al. | Feb. 18, 1958 |
| 2,873,944 | Wiese | Feb. 17, 1959 |
| 3,051,439 | Hilton | Aug. 28, 1962 |

FOREIGN PATENTS

| | | |
|---|---|---|
| 204,382 | Australia | July 5, 1956 |
| 774,499 | Great Britain | May 8, 1957 |
| 588,243 | Canada | Dec. 1, 1959 |

OTHER REFERENCES

National Aeronautics & Space Administration, Memorandum number 10–5–58E, December 1958 by Meyer & Morgan of Lewis Research Center, Cleveland, Ohio.